Oct. 9, 1956                    L. FEIGIN                    2,765,662
                               DENSITOMETER
Filed Nov. 25, 1953                                     3 Sheets-Sheet 1

INVENTOR
Leon Feigin

BY  Leonard H. King
AGENT

Oct. 9, 1956            L. FEIGIN            2,765,662

DENSITOMETER

Filed Nov. 25, 1953            3 Sheets-Sheet 2

INVENTOR
Leon Feigin

BY Leonard H. King

AGENT

United States Patent Office 2,765,662
Patented Oct. 9, 1956

2,765,662

DENSITOMETER

Leon Feigin, Bayside, N. Y., assignor to Aviation Engineering Division, Avien-Knickerbocker, Inc., Woodside, N. Y.

Application November 25, 1953, Serial No. 394,258

6 Claims. (Cl. 73—453)

This invention relates to means for measuring and indicating liquid density and in particular to such apparatus capable of providing a continuous indication at a remote location.

While many methods are available for the determination of the density of a liquid under laboratory conditions, few of these methods are capable of providing continuous information under conditions of changing density or acceleration.

The apparatus of this invention fills a long existing need for a densitometer which is capable of providing a continuous indication of liquid density at a remote indication and particularly under adverse environmental conditions. By way of example, this densitometer is suitable for use aboard a moving aircraft, where it is required that it be substantially independent of variations in ambient temperature, pressure, attitude and acceleration and vibration conditions.

An important feature of this invention is the use of a constant volume pivoted float immersed in a liquid whose density is to be measured and means for varying the position of a mass within the float in accordance with the density of the liquid so that position of the mass is indicative of the density of the liquid. The mass is shifted by means of a simple heat-actuated mechanism which is advantageous in that it avoids the use of a complex and expensive electric motor.

It is an object of this invention to provide a density measuring device which is substantially unaffected by changes in the acceleration.

It is another object of this invention to provide a densitometer which is simple and rugged.

A still different object of this invention is to provide a densitometer capable of continuously measuring and remotely indicating the density of a liquid.

A particular object of this invention is to provide a densitometer suitable for the measurement of the density of fuel in an aircraft fuel system.

Briefly stated, the densitometer of this invention consists of a constant volume pivoted member submerged in a liquid which causes a buoyant couple to act on said pivoted member. The buoyant couple is neutralized by an equal and opposite gravitational couple formed by a constant mass at a variable distance from the fulcrum. The moment arm or distance from the fulcrum is thus a measure of the density of the buoyant liquid. A mechanical structure is provided wherein the moment arm is caused to vary as a function of the volume occupied by a confined fluid. The volume occupied by the fluid is related to its temperature. Accordingly, by sensing the temperature of the fluid, an indication of its volume may be obtained. The position of the mass being related to the volume, it may be appreciated that the temperature is, therefore, indicative of the density of the liquid.

Figure 1:
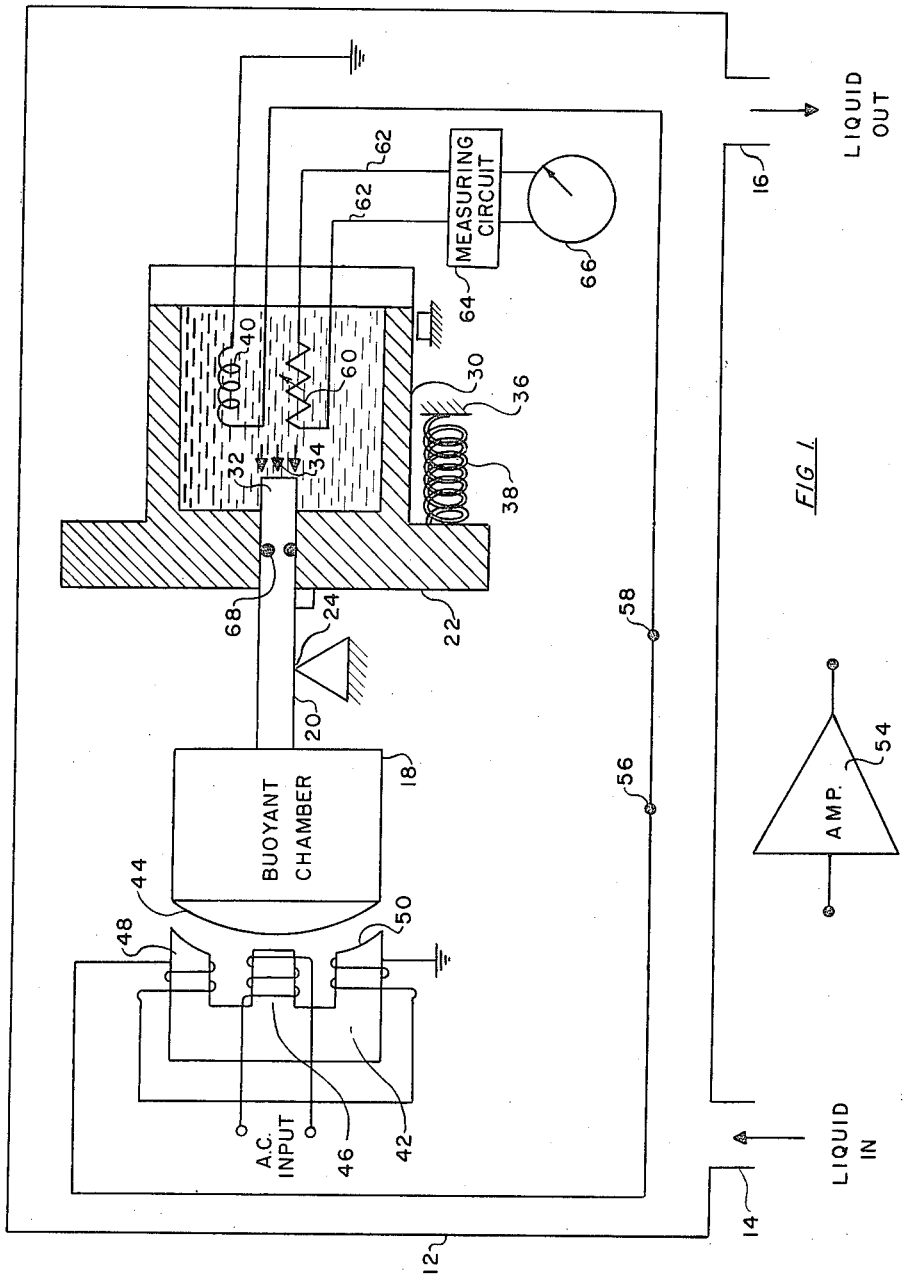
Figure 1 is shown in simplified form, partly schematically and partly pictorially, the densitometer of this invention.
Figure 2:
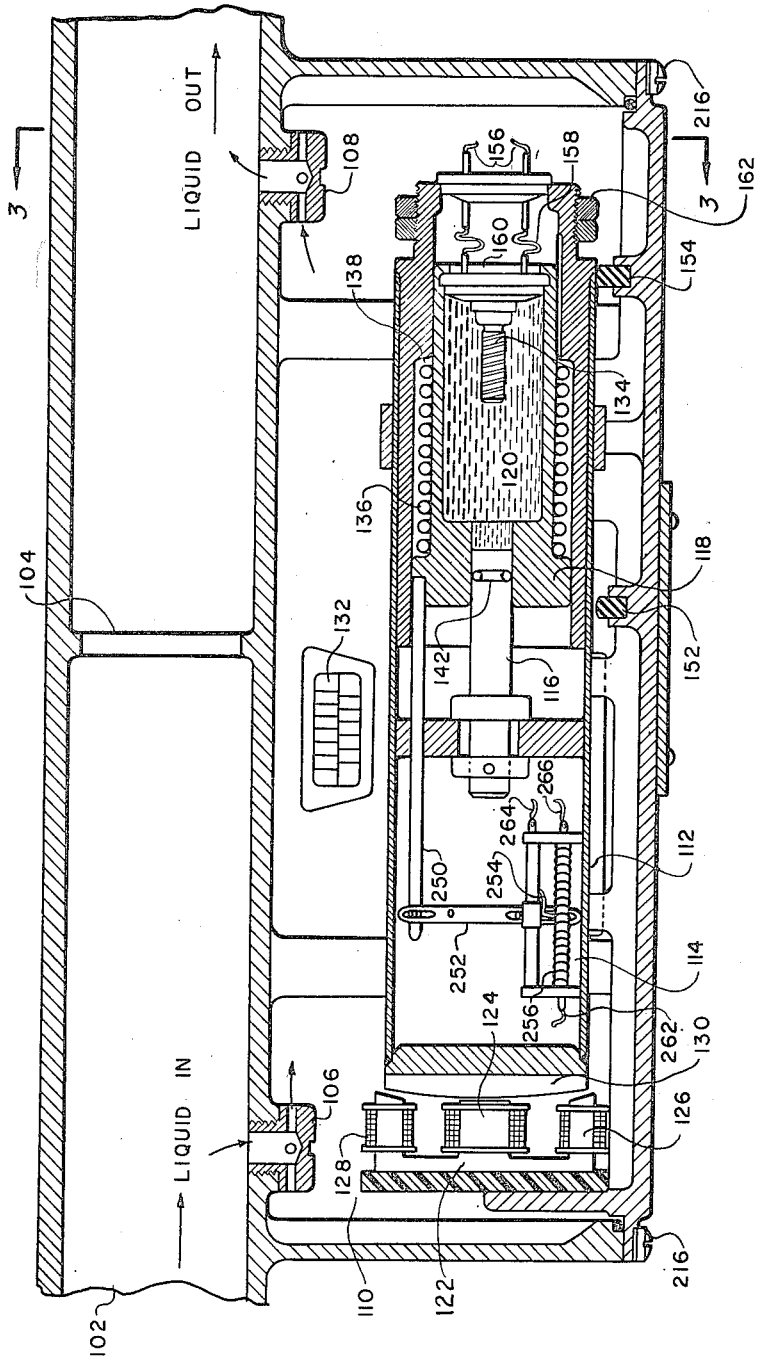
Figure 2 is a cross-sectional view taken in elevation of the densitometer of this invention.

In Figure 1 the densitometer of this invention is shown in simplified form. Sampling chamber 12 containing the densitometer element is provided with an inlet 14 and outlet 16 which permits the liquid to be sampled to pass through the chamber. Thus, the entire densitometer element is submerged in the liquid to be sensed. A buoyant chamber 18 consisting of a hollow cylinder is located on one end of a pivot arm 20. On the opposite side of the fulcrum point 24 there is positioned a movable mass 22 capable of balancing the buoyant force exerted by the liquid on the cylinder 18. This movable mass 22 consists of cylinder 30 and its contents. The arm 20 is designed to serve as a piston 32 upon which the cylinder 30 slides back and forth. The space within the cylinder 30 is filled with a fluid mass 34 having a high, linear and reproducible temperature coefficient of volumetric expansion. Compression spring 38 acts against stop 36 to cause the cylinder to assume a position depending on the volume of the fluid in the cylinder. Physically, the stop 36 is located on the pivoted member. Actually, as shown in Figure 2, this spring is wound around cylinder 30. Located within the cylinder is a heating coil 40 for varying the temperature of the expansible fluid.

Heating of the fluid causes it to expand, piston 32 being fixed. The cylinder moves compression spring 38. Cooling permits spring 38 to return the cylinder to a position nearer the fulcrum point.

The use of an expansible fluid provides a three-fold increase over the linear expansion of a solid material having the same coefficient of expansion for a given temperature change.

A magnetic E bridge 42 is positioned opposite armature 44 carried by one end of the pivot arm so as to sense the position of pivot arm 20 with respect to the horizon.

Any change in the position of the pivot arm will result in a greater flux linkage between primary winding 46 and one of the secondary windings 48 or 50 than the other, with the result that an unbalance voltage will be induced. This is in contrast to the condition of balance when the output voltage from secondary winding 50 cancels the output of bucking winding 48. The induced secondary voltage is then fed through a pair of suitable leads to heater coil 40. As a practical matter, it is necessary to provide a power amplifier 54 in the circuit between points 56 and 58 in order to derive sufficient power to enable coil 40 to raise the temperature and incidentally the volume of fluid 40 sufficiently to force the cylinder outwardly along the pivot arm so as to counter-balance the buoyant couple.

Changes in ambient temperature will have but a negligible effect on the accuracy of the instrument. There will be only one discreet volume of the expansible fluid for any given temperature and this discreet volume will define a specific location of the movable mass along the pivot arm.

Therefore, since there is only one discreet volume, accordingly the temperature of the expansible liquid is an indication of the density of the liquid being sensed.

The temperature-sensitive resistor 60 immersed in fluid 34 is connected by means of conductors 62 to a measuring circuit 64 which controls indicator 66 to provide an indication of density based on the resistance of resistor 60.

O ring seal 68 prevents escape of fluid 34 along shaft 32.

The amplifier may be designed to operate in one of two fashions. The E bridge may serve merely as an on-off switch which could be replaced with a mechanically actuated switch, if one having the proper sensitivity were available, or as is preferred, the apparatus may be designed so that the amplifier output signal is proportional to the angular position of the pivot arm. The pivot arm will never reach a stable position but will oscillate through a region between the horizontal stop position and the vertical stop position, the exact angle being dependent on a number of factors. While for a given liquid density there exists a particular position of the cylinder along the shaft, the exact angular position of the pivot arm is dependent on a number of factors. For example, the lower the ambient temperature of the liquid being sensed, the greater the heat loss from the expansible fluid. Accordingly, there is a need for a greater heat input in order to maintain balance. The arm will oscillate back and forth over a range of positions hunting a balanced position in the fashion typical of servo mechanisms until a position is attained wherein the E bridge unbalance is such that the amplifier provides the larger output signal required. It is to be noted that although a larger heated input is now provided, the temperature within the chamber for a given density liquid will still be the same inasmuch as the same degree of expansion of the fluid in the cylinder is required. Therefore, the temperature recorded by the sensing thermometer will be the same for liquids of the same density irrespective of the angle of the arm and ambient temperature.

If the E bridge is operated as an on-off switch then the pivot arm will oscillate between the horizontal stop position and another point dependent on the instrument sensitivity.

The densitometer of this invention is shown in greater detail in Figure 2. Sampling tube 102 is inserted in the fluid line. An orifice or construction 104 is provided in the tube so as to cause a pressure drop of approximately 0.1 p. s. i. Therefore, a difference of pressure exists between the first baffle 106 and second baffle 108 which are the inputs to the sampling chamber. Continuous sampling takes place because this difference in pressure causes a slow continuous flow through the sampling chamber 110. A pivoted float 112 is positioned within the sensing sampling chamber 110. The float is provided with a buoyancy chamber 114, stationary piston 116 and moving cylinder 118. Cylinder 118 is filled with viscous fluid 120; Dow Corning Corp., silicone resin D. C. 200, has been found satisfactory for this purpose. An E bridge 122 is provided having a primary center coil 124 which induces the voltage to each of the secondary coils 126 and 128. When the pivoted float 112 is in a horizontal position as shown in the drawing, equal flux linkages between primary coil 124 and secondary coil 128 through armature 130 is the same as the linkage between primary coil 124 and secondary coil 128 through armature 130. Accordingly, secondary voltages being equal and the coils being connected so as to provide a bucking reaction, a net voltage output of zero is obtained.

If the density of the liquid is insufficient to maintain the buoyant force necessary to overcome the moment arm of the pivot arm then the chamber 114 tends to rotate in a counter-clockwise manner, with the reference to the drawing, this results in a greater flux linkage of primary 124 to lower secondary 126 then from primary 124 to upper secondary winding 128. As a result an output voltage is produced by the E bridge. This voltage is applied to the amplifier via suitable leads and internal connector 132 which provides a sealed connector extending through the wall. The actual leads are not shown for purposes of clarity. The amplifier voltage is fed back through a different set of pins of the same connector 132 and goes to a heater coil 134. Fluid 120 is heated by a heater coil and is caused to expand. The heating of fluid 120 will cause it to expand resulting in the piston 116 being forced out of the cylinder 118. Since the piston 116 is fixed the cylinder 118 will move compressing spring 136 against surface 138. The energy thus stored will move the cylinder in the other direction over the shaft when the fluid 120 is permitted to cool. O ring 142 seals the fluid into the cylinder.

Header 160 seals the fluid within cylinder 118. Leads 156 are brought through the wall of the header and connect the heater to the connector block 132. Connections 156 and 158 are extremely flexible elements and thus provide negligible loading.

Silicone rubber stop 152 serves to limit the counter-clockwise motion of the pivot arm while stop 154 limits the clockwise motion so that the pivot arm will not go beyond the horizontal position.

If the pivot arm does go beyond the horizontal position, there is created a flux unbalance in the other arm of the E bridge resulting in power being applied to the heating coil. The heating would continue causing the mass of cylinder 118 to further shift to the right, therefore, heating would continue indefinitely. Provision of limit stop 154 prevents this situation from occurring.

The amplifier could also be arranged so that when the E bridge becomes unbalanced by the clockwise movement of the pivot arm the heating power is reduced. This would require a phase-sensitive amplifier apparatus, a more expensive and complex device not normally warranted.

Figure 3:
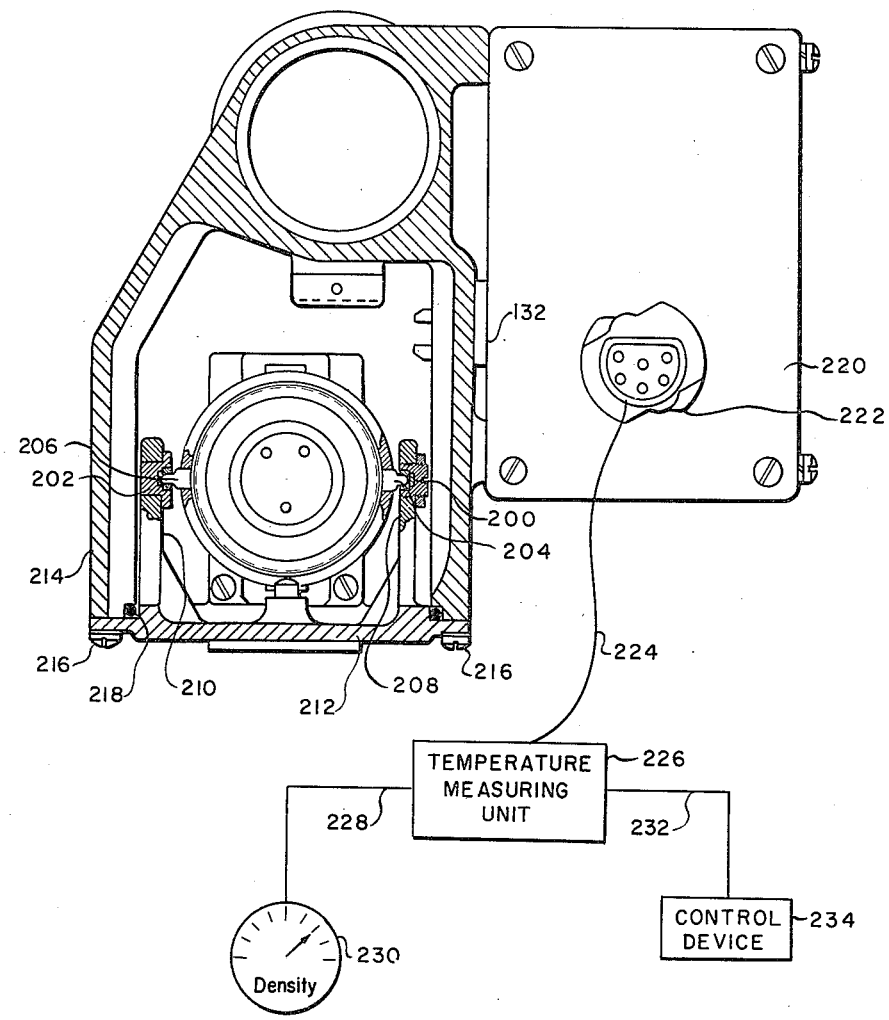
Figure 3 is a sectional end view of the densitometer taken along plane 3—3 of Figure 2.

The sensitivity of the instrument is in part dependent on the friction in the system. Accordingly, as is disclosed in Figure 3, jeweled bearings 200 and 202 are used to support pivot shafts 204 and 206. The shafts are supported by posts 208 and 210 which are mounted upon base plate 212 which is secured to housing 214 by means of bolts 216. Gasket 218 provides a liquid-tight seal. The amplifier is located in housing 220. Connector 222 serves to connect conductors 224 shown schematically to temperature measuring unit 226. The output of which is fed by means of conductor 228 to indicator 230 and by means of conductor 232 to a control device 234 which may be used to operated auxiliary equipment as for example a computer circuit in conjunction with a volumetric fuel quantity measuring apparatus so as to provide a gravimetric indication of fuel quantity. Connector 132 is shown plugged into side of amplifier case 220. This provides a convenient means for disconnecting the amplifier case for servicing.

A pair of interfering nuts 162 are used to critically adjust the balance of the buoyant float.

With respect to the just described preferred embodiment, attention is directed to the fact that center of buoyancy, center of gravity and pivot point lie along a straight line. This symmetry contributes to the attitude insensitivity of the instrument since the ratio of the lengths of the moment arms remain constant irrespective of attitude.

For purposes of illustration an alternate sensing means is provided in Figure 2 which permits determining the position of the mass directly in terms of a voltage.

Shaft 250 is coupled to cylinder 118. Movement of the shaft causes pivoted arm 252 to move potentiometer brush 254 along potentiometer element 256. The arm permits multiplying the linear movement of the shaft to obtain greater resolution than if the potentiometer were directly coupled. The position of the brush, which determines the output voltage of the potentiometer, is thus a function of the cylinder position.

Potentiometer terminals 262, 264 and 266 are connected by means of insulated wire conductors to hermetically sealed terminals (not shown) which extend to the outside of the buoyant chamber. Suitable conductors then provide a conductive path to terminal block 132. Conventional circuitry well known to the art may be connected at this point to operate indicators or other equipment.

It is intended that the potentiometer shown be omitted if the temperature sensing method is used.

Other ways of sensing the position of the mass would be using a variable inductance or capacitance.

The E bridge may be replaced by a simple on-off switch, a capacitor having a movable plate, a vacuum tube of the type having a movable grid or other equivalent devices.

The O ring seal 142 may be replaced by a bellows which if properly selected for its spring rate will eliminate the need for spring 138.

While I have disclosed what is currently the best embodiment of this invention it is to be understood that modifications may be made in the design without departing from the spirit of the invention as covered by the appended claims.

What I claim as new is:

1. A densitometer for continuously measuring the density of a liquid comprising: liquid containing means, a fixed reference member within said containing means, a balanceable beam consisting of a pivoted float member submerged in said liquid so that the balance of the beam with respect to said reference member about said pivot point is a function of said liquid density, a shaft member within said float positioned transversely to said pivot, a counterbalance comprising a hollow movable mass arranged to slide on one end of said shaft so that said end extends into said hollow portion and the position of said counterbalance on said shaft when said float is at said reference member is indicative of said density, a fluid confined within said mass so that an increase in the volume of said fluid produces a force against said shaft end so as to cause said mass to move in a first direction and change the balance of said beam, means to move said mass in a direction opposite said first direction when said volume of fluid decreases, means to detect the angular position of said float with respect to said reference member, means under control of said last named means to heat said fluid to a temperature at which said fluid is expanded sufficiently to shift said mass to a shaft position at which said beam is balanced with respect to said reference member, so that said temperature is indicative of the position of said mass and said density, and means to sense the position of said mass on said shaft when said beam is balanced with respect to said reference member so as to provide an indication of said density.

2. A densitometer for continuously measuring the density of a liquid comprising: means for sampling said liquid, a chamber in combination with said sampling means for holding said liquid sample, a fixed reference member in said chamber, a balanceable beam consisting of a pivoted float member submerged in said liquid sample so that the balance of the beam with respect to said reference means about said pivot point is a function of said liquid density, a shaft member within said float positioned transversely to said pivot, a counterbalance comprising a hollow movable mass arranged to slide on one end of said shaft so that said end extends into said hollow portion and the position of said counterbalance on said shaft when said float is at said reference means is indicative of said density, a fluid confined within said mass so that an increase in the volume of said fluid produces a force against said shaft end so as to cause said mass to move in a first direction and change the balance of said beam, means to move said mass in a direction opposite said first direction when said volume of fluid decreases, said reference member comprising means to detect the unbalance of said beam, means under control of said last named means to heat said fluid to a temperature at which said fluid is expanded sufficiently to shift said mass to a shaft position at which said beam is balanced with respect to said reference member, so that said temperature is indicative of the position of said mass and said density, and means to sense the position of said mass on said shaft when said beam is balanced with respect to said reference member so as to provide an indication of said density.

3. The apparatus of claim 2 wherein said mass position sensing means comprises means for measuring the temperature of said fluid.

4. The apparatus of claim 2 wherein said mass position sensing means comprises a resistance wire thermometer immersed in said fluid.

5. The apparatus of claim 2 wherein said sensing means comprises a potentiometer having a variable wiper positioned in accordance with the position of said mass, and means controlled by said potentiometer for indicating said density.

6. A densitometer adapted for insertion in a pipe line carrying a liquid comprising a sampling chamber, means to divert a portion of said liquid into said sampling chamber, a fixed reference member in said chamber, a balanceable beam consisting of a pivoted float member submerged in said liquid sample so that the balance of the beam with respect to said reference member about said pivot point is a function of said liquid density, a shaft member within said float positioned transversely to said pivot, a counterbalance comprising a hollow movable mass arranged to slide on one end of said shaft so that said end extends into said hollow portion and the position of said counterbalance on said shaft when said float is at said reference member is indicative of said density, a fluid confined within said mass so that an increase in the volume of said fluid produces a force against said shaft end so as to cause said mass to move in a first direction and change the balance of said beam, means to move said mass in a direction opposite said first direction when said volume of fluid decreases, said reference member comprising means to detect the unbalance of said beam, means under control of said last named means to heat said fluid to a temperature at which said fluid is expanded sufficiently to shift said mass to a shaft position at which said beam is balanced with respect to said reference member, so that said temperature is indicative of the position of said mass and said density, and means to sense the position of said mass on said shaft when said beam is balanced with respect to said reference member so as to provide an indication of said density.

References Cited in the file of this patent

UNITED STATES PATENTS

| | | |
|---|---|---|
| 1,303,425 | Wohlenberg | May 13, 1919 |
| 2,442,039 | Fortney | May 25, 1948 |
| 2,459,542 | Rosenberger | Jan. 18, 1949 |